(12) United States Patent
Liu et al.

(10) Patent No.: US 8,397,855 B2
(45) Date of Patent: Mar. 19, 2013

(54) FOUR-WHEEL DRIVE ELECTRIC VEHICLES

(75) Inventors: Changwen Liu, Shenzhen (CN); Xiaojing Liu, Shenzhen (CN); Sen Feng, Shenzhen (CN)

(73) Assignees: Guangdong Greenwheel EV Power Train System Co., Ltd, Tianliao Community, Gongming Office, New Guangming District, Shenzhen, Guangdong (CH); Changwen Liu, Tianliao Community, Gongming Office, New Guangming District, Shenzhen, Guangdong (CN)

( * ) Notice: Subject to any disclaimer, the term of this patent is extended or adjusted under 35 U.S.C. 154(b) by 131 days.

(21) Appl. No.: 12/879,018

(22) Filed: Sep. 10, 2010

(65) Prior Publication Data

US 2011/0061961 A1    Mar. 17, 2011

(30) Foreign Application Priority Data

Sep. 11, 2009  (CN) .......................... 2009 1 0190186

(51) Int. Cl.
*B60K 17/356*    (2006.01)
*B60K 1/00*    (2006.01)

(52) U.S. Cl. .................... 180/242; 180/65.1; 180/65.24; 180/240

(58) Field of Classification Search .................. 180/242, 180/65.1–65.3
See application file for complete search history.

(56) References Cited

U.S. PATENT DOCUMENTS

| | | | |
|---|---|---|---|
| 7,134,517 B1 * | 11/2006 | Kaiser et al. .................. | 180/65.6 |
| 7,808,214 B2 * | 10/2010 | Bartilson ....................... | 320/167 |
| 7,926,608 B2 * | 4/2011 | Horii et al. .................... | 180/216 |
| 2002/0104704 A1 * | 8/2002 | Chang ........................... | 180/242 |
| 2005/0115748 A1 * | 6/2005 | Lanier .......................... | 180/65.1 |
| 2007/0259747 A1 * | 11/2007 | Thomas et al. .................. | 475/5 |
| 2009/0014223 A1 * | 1/2009 | Jones et al. ................... | 180/65.8 |

* cited by examiner

*Primary Examiner* — Tashiana Adams
*Assistant Examiner* — Marlon Arce

(57) ABSTRACT

A four-wheel drive electric vehicle is provided. The vehicle comprises a chassis and a power system. The power system comprises batteries, an electric motor, a DC-DC converter and an electric motor controller which are electrically connected, and the chassis comprises a frame, a transmission/transfer case, a drive shaft, a front axle assembly as well as a rear axle assembly. The transmission/transfer case, the front axle assembly and the rear axle assembly are mounted on the frame. The transmission/transfer case is connected with the rear axle assembly directly and with the front axle assembly via the drive shaft. Under the control of the electric motor controller, the electric motor is driven to rotate by the batteries, whereby a power is transferred from the motor to the transmission/transfer case, and a part of the power is transferred to the rear axle assembly with the other part transferred to the front axle assembly via the drive shaft.

8 Claims, 1 Drawing Sheet ic vehicle of the present invention; and

FOUR-WHEEL DRIVE ELECTRIC VEHICLES

CROSS-REFERENCE TO RELATED DOCUMENTS

The present invention claims priority from China patent application No. 200910190186.0, entitled FOUR-WHEEL DRIVE ELECTRIC VEHICLES and filed on Sep. 11, 2010, the entire content of which is incorporated herein by reference.

FIELD OF THE INVENTION

The present invention relates to an electric vehicle, and more particularly, to a four-wheel drive electric vehicle.

BACKGROUND OF THE INVENTION

Currently, more attention has been paid to the environmental protection owing to the increasingly serious energy crisis. Car manufacturers around the world start developing electric vehicles in an effort to gradually replace the traditional vehicles which mainly powered by gasoline. Nevertheless, most pure electric vehicles available are two-wheeled motorcycles. For example, CN 02130194.8 discloses a two-wheeled vehicle driven by batteries with reduced comfort and safety in comparison with traditional four-wheel vehicles.

To this end, four-wheeled electric vehicles, such as electric ATVs (All-Terrain Vehicles), were developed with a compact and simple structure. For example, CN 200420094023.5 discloses an electric ATV wherein major components such as batteries and electric motor are arranged at the front end of the chassis, resulting in a higher chassis and a very complicated vehicle forepart. Further, vehicles of this kind do not have a pretty appearance and a satisfactory performance in vehicle safety.

CN 200920008997.X discloses a hybrid electric vehicle wherein the structure of the power system thereof is very complicated. Pure electric vehicles, which have an appearance as normal four wheel vehicles but with electric two-wheel drive, are being developed as well. These pure electric vehicles make people feel very comfortable when sitting inside. However, under certain circumstances, such as driving on the wet snowy or rugged road surface, the driving force and endurance of the pure electric vehicles are not satisfactory. Furthermore, some pure electric four wheel drive vehicles like BYD e6 are being launched as well, but problems happen regularly due to the large body and great demand for electric power.

SUMMARY OF THE INVENTION

To solve the above-mentioned problems, the present invention provides a four-wheel drive electric vehicle in the shape of a normal four-wheel vehicle. The present electric vehicle has a pretty appearance and very comfortable. Moreover, the present electric vehicle is provided with single-row seats, which is energy-saving and environmental-friendly, enabling the electric vehicle to travel a longer distance than conventional ones with same battery capacity, and providing the drivers with better experience in terms of driving force. The vehicle of the present invention will possibly prevail due to its compact structure and reasonable space arrangement.

The present invention provides a four-wheel drive electric vehicle, comprising a chassis and a power system, wherein the power system comprises batteries, an electric motor, a DC-DC converter and an electric motor controller which are electrically connected, and the chassis comprises a frame, a transmission/transfer case, a drive shaft, a front axle assembly as well as a rear axle assembly, and wherein the transmission/transfer case, the front axle assembly and the rear axle assembly are mounted on the frame; the transmission/transfer case is connected with the rear axle assembly directly and with the front axle assembly via the drive shaft; and under the control of the electric motor controller, the electric motor is driven to rotate by the batteries, whereby a power is transferred from the motor to the transmission/transfer case, and a part of the power is transferred to the rear axle assembly with the other part transferred to the front axle assembly via the drive shaft.

Furthermore, the present invention is characteristic of the following technical features.

The rear axle assembly comprises a left-half rear axle and a right-half rear axle used to transfer the power to a left rear wheel and a right rear wheel respectively. Likewise, the front axle assembly comprises a left-half front axle and a right-half front axle used to transfer the power respectively to a left front wheel and a right front wheel. In comparison with the current two-wheel drive vehicles, the four-wheel drive electric vehicles of the present invention are adaptable to more complicated terrain and have better performance in gradeability and straight line stability etc.

The batteries constitute of two groups positioned respectively above the middle of the chassis and symmetrically located with respect to the drive shaft. The chassis is thus well-balance due to the uniform distribution of the weight and the four-wheel drive electric vehicle can provide a better stability when driving.

In addition, the DC-DC converter and the electric motor controller are arranged between the two groups of batteries in the direction of the drive shaft, with the DC-DC converter being set in front of the electric motor controller. The electric motor and the transmission/transfer case are located at the rear side of the chassis and above the rear axle assembly. The seats may be arranged over components with large volume, such as the electric motor controller and the electric motor. Therefore the structure of the present invention is compact thanks to its reasonable space utilization. Moreover, all of the main components are positioned at the rear side of the vehicle, providing a greater flexibility in design of the forepart of the present electric vehicle. The present invention is completely powered by electricity and provided only with single-row seats, thus the structure of the chassis is simple and reliable. The present electric vehicle is also very economic and convenient to maintain.

BRIEF DESCRIPTION OF THE DRAWINGS

These and other objects of the present invention can be better appreciated from the following detailed description of the preferred embodiments and the accompanying drawings, in which.

DETAILED DESCRIPTION OF THE INVENTION

Figure 1:
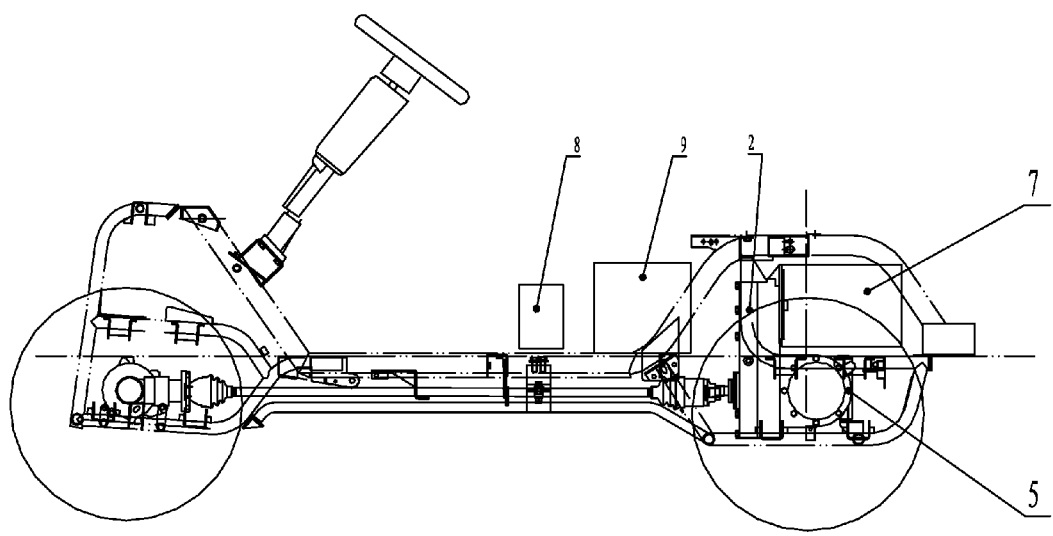
FIG. 1 is a schematical view illustrating a four-wheel drive electric vehicle of the present invention.
Figure 2:
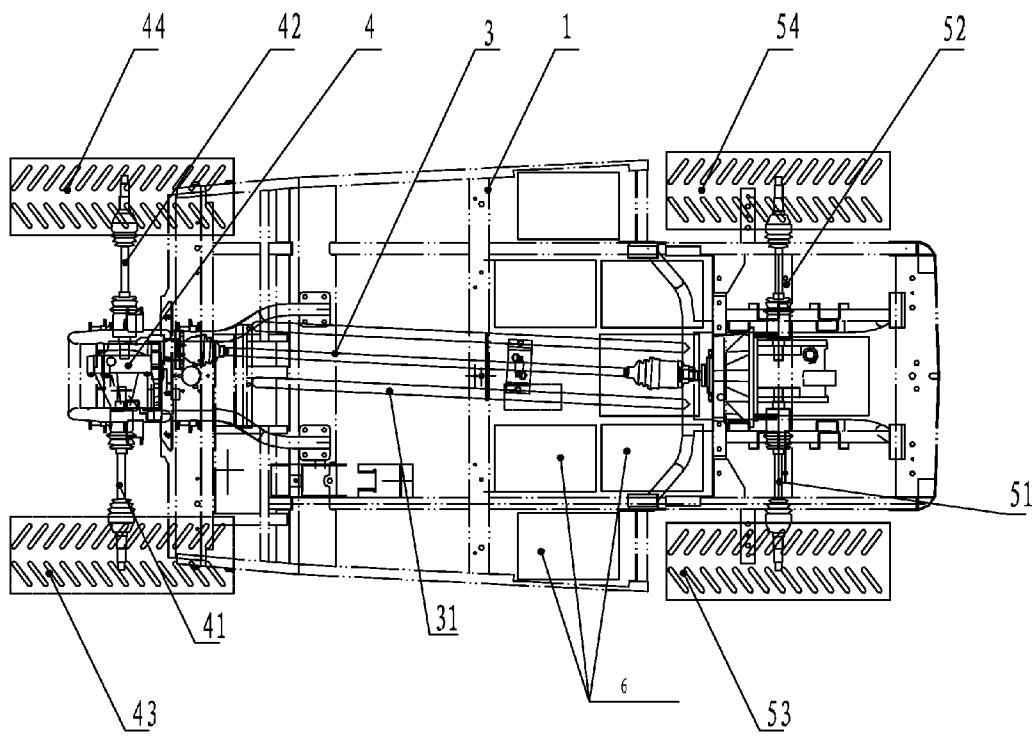
FIG. 2 is a top view of the four-wheel drive electric vehicle shown in FIG. 1.

Referring to FIG. 1-2, a four-wheel drive electric vehicle is provided. The vehicle comprises a chassis and a power system. The chassis comprises a frame 1, a transmission/transfer case 2, a drive shaft 3, a front axle assembly 4 as well as a rear axle assembly 5. The power system comprises batteries 6, an electric motor 7, a DC-DC converter 8 and an electric motor controller 9 which are electrically connected. The transmission/transfer case 2, the front axle assembly 4 and the rear axle assembly 5 are mounted on the frame 1. The transmission/transfer case 2 is connected with the rear axle assembly 5 directly and with the front axle assembly 4 via the drive shaft 3. Under the control of the electric motor controller 9, the electric motor 7 is driven to rotate by the batteries 6, whereby a power is transferred from the motor 7 to the transmission/transfer case 2, and a part of the power is transferred to the rear axle assembly 5 with the other part transferred to the front axle assembly 4 via the drive shaft 3. Conventional structures used in internal combustion vehicle can also be used for the present invention; details are thus omitted from description.

In accordance with the present invention, the frame 1 is served to support the engine and its components so that to form an integral shape of the vehicle. The transmission/transfer case 2 is used on one hand to alter the transmission ratio so as to meet requirements under different driving situations and on the other hand to distribute the power output by the electric motor 7 to the front axle assembly 4 and the rear axle assembly 5. The seats could be arranged over components with large volume, such as the electric motor controller 9 and the electric motor 7. Therefore the structure of the present invention is compact thanks to its reasonable space utilization. Moreover, all of the main components are positioned at the rear side of the vehicle, providing a greater flexibility in design of the forepart of the present electric vehicle.

Referring to FIG. 1, the batteries 6 constitute of two groups positioned respectively above the middle of the chassis and symmetrically located with respect to the drive shaft 3. The DC-DC converter 8 and the electric motor controller 9 are arranged between the two groups of batteries 6 in the direction of the drive shaft 3, with the DC-DC converter 9 being set in front of the electric motor controller 9. The electric motor 7 and the transmission/transfer case 2 are located at the rear side of the chassis and above the rear axle assembly 5.

In a preferred embodiment of the present invention, the rear axle assembly 5 comprises a left-half rear axle 51 and a right-half rear axle 52 connected to each other. Likewise, the front axle assembly 4 comprises a left-half front axle 41 and a right-half front axle 42 connected to each other. Four wheels are arranged at both sides of the front axle assembly 4 and the rear axle assembly 5. The rear axle assembly 5 is used to transfer the power respectively to a left rear wheel 53 and a right rear wheel 54 respectively. The front axle assembly 4 is used to transfer the power to a left front wheel 43 and a right front wheel 44. In accordance with the present invention, the power is transferred to the wheels through the front axle assembly 4 and the rear axle assembly 5 to drive the electric vehicle.

In another preferred embodiment of the present invention, the electric vehicle of the present invention comprises a deceleration system comprising a transmission/transfer case deceleration system, a front wheel deceleration system as well as a rear wheel deceleration system. The front wheel deceleration system is arranged in the front axle assembly 4. When the driving force is transferred to the front wheel deceleration system arranged in the front axle assembly 4 through the transmission/transfer case deceleration system and the drive shaft 3, a front driving force deceleration is achieved. A rear driving force deceleration is achieved by the rear wheel deceleration system which is fixedly connected to the transmission/transfer case deceleration system.

The electric motor 7 of the present invention can either be a DC electric motor or an AC electric motor. Accordingly, the electric motor controller 9 can be a DC electric motor controller or an AC electric motor controller. The electric motor 7 is arranged longitudinally above the transmission/transfer case 2 and in connection therewith.

In order to protect the drive shaft 3 from being scraped by the rugged ground, two protection tubes 31 are mounted under the drive shaft 3 with one on the left side and the other on the right side. Furthermore, the protection tubes 31 are mounted parallel to the drive shaft, with first ends of the tubes connecting with the front axle assembly 4 and second ends thereof connecting with the transmission/transfer case 2.

What is claimed is:

1. A four-wheel drive electric vehicle, comprising a chassis and a power system, wherein
   the power system comprises batteries, an electric motor, a DC-DC converter and an electric motor controller which are electrically connected; and
   the chassis comprises a frame, a transmission/transfer case, a drive shaft, a front axle assembly as well as a rear axle assembly, and wherein
   the transmission/transfer case, the front axle assembly and the rear axle assembly are mounted on the frame;
   the transmission/transfer case is connected with the rear axle assembly directly and with the front axle assembly via the drive shaft; and
   under the control of the electric motor controller, the electric motor is driven to rotate by the batteries, whereby a power is transferred from the motor to the transmission/transfer case, and a part of the power is transferred to the rear axle assembly with the other part transferred to the front axle assembly via the drive shaft; the batteries constitute of two groups positioned respectively above the middle of the chassis and symmetrically located with respect to the drive shaft and
   the DC-DC converter and the electric motor controller are arranged between the two groups of batteries, the electric motor and the transmission/transfer case being located at the rear side of the chassis and above the rear axle assembly.

2. The electric four wheel drive vehicle in claim 1, wherein the rear axle assembly, comprises a left-half rear axle and a right-half rear axle used to transfer the power to a left rear wheel and a right rear wheel respectively, and
   the front axle assembly comprises ,a left-half front axle and a right-half front axle used to transfer the power to a left front wheel and a right front wheel respectively.

3. The electric four wheel drive vehicle in claim 1, wherein the electric motor is a DC electric motor, and correspondingly the electric motor controller is a DC electric motor controller.

4. The electric four wheel drive vehicle in claim 1, wherein the electric motor is an AC electric motor, and correspondingly the electric motor controller is an AC electric motor controller.

5. The electric four wheel drive vehicle in claim 1, wherein the electric motor is arranged longitudinally above the transmission/transfer case and in connection therewith.

6. The electric four wheel drive vehicle in claim 1, wherein the electric four wheel drive vehicle further comprises a deceleration system comprising a transmission/transfer case deceleration system, a front wheel deceleration system as well as a rear wheel deceleration system;
   the front wheel deceleration system is arranged in the front axle assembly 4, and when the driving force is transferred to the front wheel deceleration system arranged in the front axle assembly 4 through the transmission/transfer case deceleration system and the drive shaft 3, a front driving force deceleration is achieved; and a rear driving force deceleration is achieved by the rear wheel deceleration system which is fixedly connected to the transmission/transfer case deceleration system.

7. The electric four wheel drive vehicle in claim 1, wherein two protection tubes are mounted under the drive shaft with one on the left side and the other on the right side; and a first end of each of the tubes is connected with the front axle assembly and a second end of each of the tubes is connected with the transmission/transfer case.

8. The electric four wheel drive vehicle in claim 7, wherein the protection tubes are mounted parallel to the drive shaft.

* * * * *